DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 30, 1971

892 O.G. 1605

T892,022
MECHANISM FOR EFFECTING SYNCHRONOUS PERCUSSIVE FLASH EXPOSURES

William T. Hochreiter, 23 Chestnut Drive, Rochester, N.Y. 14624

Filed Mar. 27, 1970, Ser. No. 23,129
Int. Cl. G03b *15/04*
U.S. Cl. 95—11.5
6 Sheets Drawing. 28 Pages Specification

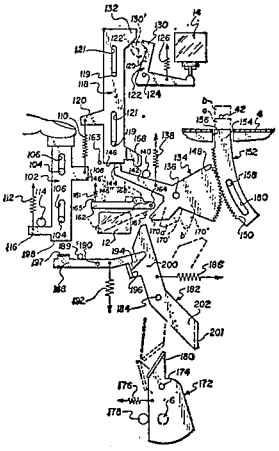

A mechanism for effecting synchronous flash exposures in a camera adapted to receive a percussive flash device of the type incorporating a pre-energized impacting member. According to several embodiments, a high energy lever is released from a set condition in response to the displacement of a release member, and operates to actuate the camera shutter and release the impacting member of the flash device, thereby effecting a synchronous flash exposure. The condition of the impacting member at the camera firing site is determined by a gear driven actuating probe, which additionally serves to fire the flash device. A visual signal indicates that the impacting member is not in the set condition. According to other embodiments, displacement of a release member by a prescribed amount in turn moves a latch which releases high energy levers for effecting synchronous flash exposures.

MISSING PAGE TEMPORARY NOTICE

PATENT # T 892,022 FOR ISSUE DATE 11-30-1971

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

ALL DRAWING SHEETS.